United States Patent [19]

Katayama et al.

[11] Patent Number: 4,960,405
[45] Date of Patent: Oct. 2, 1990

[54] TRACTION DRIVE SPINDLE DEVICE

[75] Inventors: Eiichi Katayama; Kouichi Ueda; Hiroaki Takebayashi; Kazuo Rokkaku, all of Osaka, Japan

[73] Assignees: Koyo Seiko Co., Ltd.; Showa Tool Co., Ltd., both of Osaka, Japan

[21] Appl. No.: 358,093

[22] Filed: May 30, 1989

[30] Foreign Application Priority Data

Jun. 8, 1988 [JP] Japan ................. 63-141395

[51] Int. Cl.⁵ .................. F16H 13/06; B23B 39/10
[52] U.S. Cl. .................. 475/183; 408/126
[58] Field of Search ........... 74/796, 798, 782, 801, 74/785, 206; 384/492, 913, 907.1; 408/126, 238, 239 A; 409/232, 234; 475/165, 166, 183

[56] References Cited

U.S. PATENT DOCUMENTS

| | | | |
|---|---|---|---|
| 3,965,773 | 6/1976 | Bert et al. | 475/165 |
| 4,491,038 | 1/1985 | Kraus | 74/798 |
| 4,741,650 | 5/1988 | Nakata | 408/126 X |
| 4,792,244 | 12/1988 | Yamashita et al. | 384/492 |
| 4,808,014 | 2/1989 | Ueda et al. | 384/492 |

FOREIGN PATENT DOCUMENTS 3106421  5/1988  Japan ................. 384/907.1
1613372 11/1948  United Kingdom ........ 475/183

Primary Examiner—Leslie A. Braun
Assistant Examiner—Khoi Q. Ta
Attorney, Agent, or Firm—Finnegan, Henderson, Farabow, Garrett and Dunner

[57] ABSTRACT

A traction drive spindle device includes an input shaft connectable to a drive main shaft for rotation therewith. A hollow holder shaft is connected to an output end of the input shaft in coaxial relation thereto, the hollow holder shaft having a plurality of planetary rollers mounted thereon intermediate opposite ends of the holder shaft. A high-speed spindle is rotatably received in a bore of the hollow holder shaft, the high-speed spindle having an inner end portion which is received in the bore and serves as a sun shaft disposed in rolling contact with the planetary rollers. A housing is mounted on the outer periphery of the holder shaft through a first ball-and-roller bearing so as to be rotatable relative to the holder shaft, the housing having a fixed ring fixed to an inner periphery thereof. The planetary rollers are disposed in rolling contact with the fixed ring. A second ball-and-roller bearing is interposed between the holder shaft and the high-speed spindle. Only the balls and both the balls and the rollers of the second ball-and-roller bearing are made of ceramics.

11 Claims, 3 Drawing Sheets

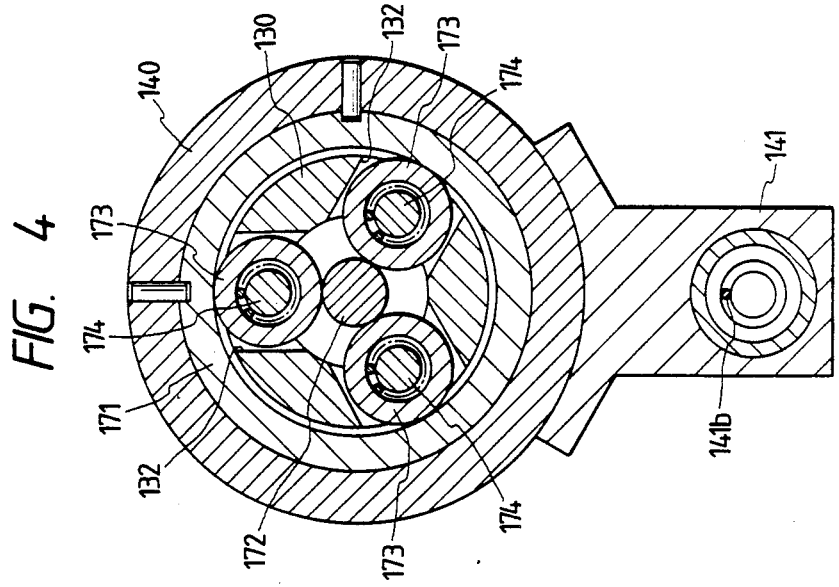
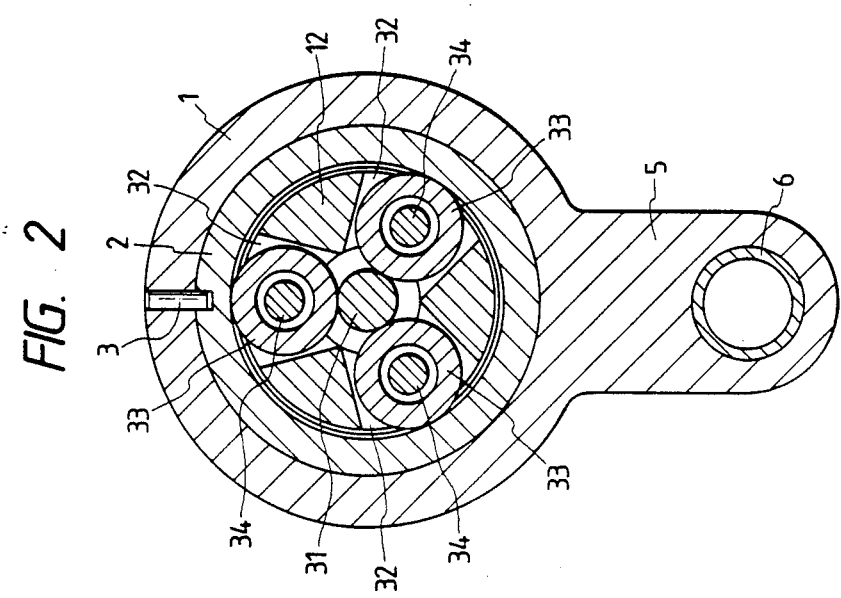

TRACTION DRIVE SPINDLE DEVICE

BACKGROUND OF THE INVENTION

1. Field of the Invention

This invention relates generally to a traction drive spindle device to be connected to main shafts of various machine tools and more particularly to such a device best suited for rotating a cutting tool of drive spindle device small diameters at a high speed.

2. Prior Art

In a conventional speed-up spindle of general types, a planetary gear mechanism is connected between an input shaft, connected to the main shaft of the machine, and a high-speed spindle (an output shaft) having a chuck attached to its front end. The speed of rotation of the input shaft is increased by the planetary gear mechanism so that the high-speed spindle rotates at a high speed.

Such a high-speed spindle device incorporating the planetary gear mechanism, however, has been found disadvantageous, in that the device is inferior in rigidity, and as a result, the device is liable to undergo vibration during the machining operation. Another problem is that the device can operate only under a relatively low load.

SUMMARY OF THE INVENTION

It is therefore an object of this invention to provide a traction drive spindle device which has an increased rigidity and employs a traction drive mechanism, having a mechanism excellent in efficiency and high-speed rotation performance, as a speed-up means.

Another object is to provide such a traction drive spindle device in which the overall construction has an increased rigidity so as to enhance the precision of rotation and also to prolong a service life of the device.

According to a first aspect of the present invention, there is provided a traction drive spindle device comprising:

a holder shaft rotatably supported in a housing having a rotation-preventing means for preventing the housing from rotating relative to a machine body;

an outer ring of the traction drive mechanism provided around the holder shaft in radially spaced, coaxial relation thereto, the outer ring being fixedly secured to an inner periphery of the housing;

an input shaft connected to a rear end of the holder shaft;

a high-speed spindle inserted in a bore which is formed in the holder shaft and extends axially from a front end toward a rear end of the holder shaft and rotatably supported thereby, the high-speed spindle having a tool holder means provided at a front end portion thereof extending exteriorly, the high-speed spindle having a rear end connected to a roller shaft portion which functions as a sun roller of the traction drive mechanism, the holder shaft having at least three radial holes formed at a substantially center portion thereof, and the holes being spaced from one another circumferentially through the holder shaft to the bore; and planetary rollers mounted respectively in the holes and rotatably supported by the holder shaft, the planetary rollers being in sliding-contact with an inner peripheral surface (race) of the outer ring and the roller shaft portion to thereby constitute the traction drive mechanism.

It is preferred that an annular groove for holding a lubricant be formed in the inner peripheral surface of the outer ring.

With this construction, when the holder shaft connected to the input shaft rotates, the planetary rollers revolve around the sun roller while rotating about their own axes, so that the high-speed spindle is rotated at an increased speed. Normal forces are produced through interference of the planetary rollers interposed between the outer ring and the sun roller, so that the shearing resistance of a film of oil (lubricant) present at the area of contact between each planetary roller and the sun roller produces the transmission torque.

According to a second aspect of the present invention, there is provided a traction drive spindle device comprising:

an input shaft connected to a drive main shaft (spindle) for rotation therewith;

a hollow holder shaft connected to an output end of the input shaft in coaxial relation thereto, the hollow holder shaft having a plurality of planetary rollers mounted in a intermediate position thereon;

a high-speed spindle rotatably mounted in a bore of the hollow holder shaft, the high-speed spindle having an inner end portion which is received in the bore and serves as a sun roller disposed in rolling contact with the planetary rollers;

a housing mounted on the outer periphery of the holder shaft through a first ball-and-roller bearing so as to be rotatably relative to the holder shaft, the housing having a fixed ring fixed to an inner periphery thereof, and the planetary rollers being disposed in rolling contact with the fixed ring; and a second ball-and-roller bearing interposed between the holder shaft and the high-speed spindle, only the balls or both the balls and rollers of the second ball-and-roller bearing being made of ceramics.

With this construction, the rotation of the main shaft is transmitted to the holder shaft connected substantially integrally to the tapered shank. In accordance with the rotation of the holder shaft, the planetary rollers, which are mounted respectively on planetary shafts mounted on the holder shaft at a substantially center portion of the holder shaft in the axial direction thereof, revolve around the sun roller while rotating about their own axes. As a result, the rotational speed of the sun roller is increased at a certain rate, thus rotating the high speed spindle at a increased speed.

Since the housing is mounted on the outer periphery of the holder shaft integrally connected to the input shaft, the inclining of the housing is resisted by the holder shaft, thereby restraining the inclining of the housing. Even if the housing is lightly inclined, the high-speed spindle serving as the output shaft can stably rotate in alignment with the main shaft since the high-speed spindle is not supported directly by the housing but is supported by the holder shaft.

Further, since only the balls or both the balls and the rollers of the ball-and-roller bearing supporting the high-speed spindle rotatable at a high speed are made of ceramics, a lubricant, sealed in a space in which this bearing is disposed, can have a longer service life than that being used in a bearing of metal.

BRIEF DESCRIPTION OF THE DRAWINGS

FIG. 2 is a cross-sectional view taken along the line II—II of FIG. 1;

FIG. 4 is a cross-sectional view taken along the line IV—IV of FIG. 3.

DESCRIPTION OF THE PREFERRED EMBODIMENTS OF THE INVENTION

Figure 1:
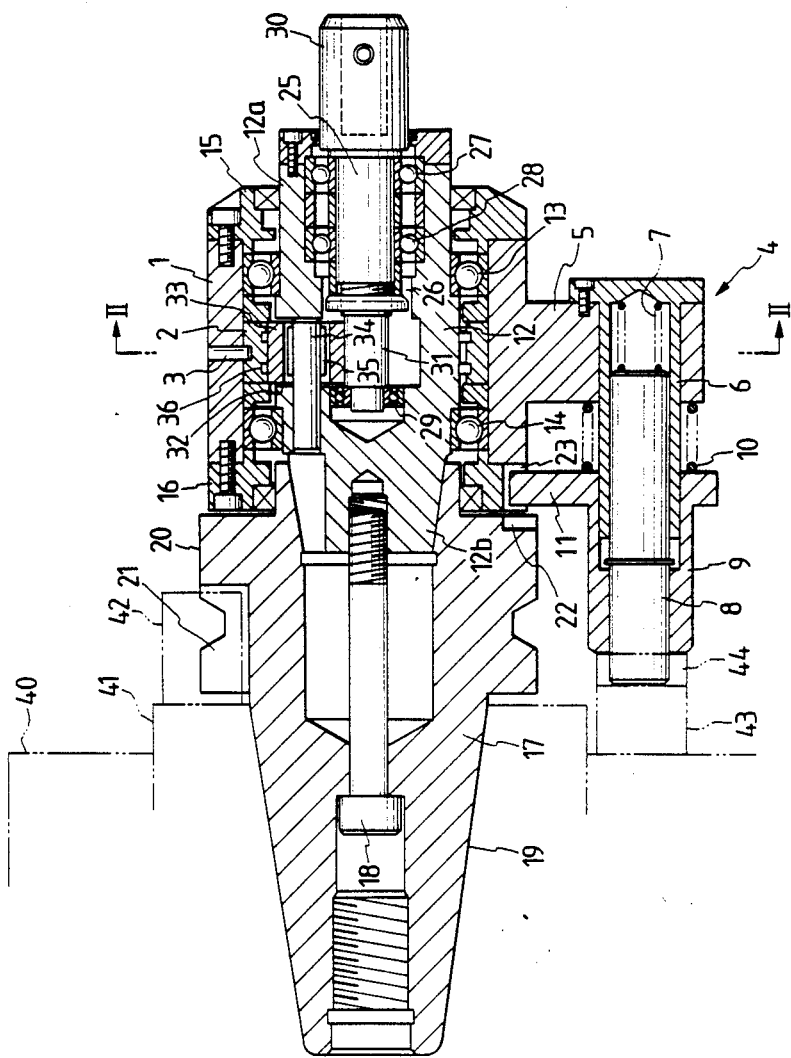
FIG. 1 is a cross-sectional view of a traction drive spindle device provided in accordance with the present invention.

A first preferred embodiment of the present invention will now be described with reference to FIGS. 1 and 2. Here, the present invention is embodied in a traction drive spindle device for use in an automatic tool changer. (A.C.T)

An outer ring 2 of a traction drive mechanism is mounted within a housing 1 at a central portion thereof and is held in contact with the inner peripheral surface of the housing 1, the housing 1 constituting a body of the speed-up spindle device. The outer ring 2 is fixed to the housing 1 by a retainer pin 3. The tubular housing 1 is provided with a rotation-preventing means 4 which prevents the housing 1 from rotating relative to a machine body 40. More specifically, the rotation-preventing means 4 comprises an arm 5 extending radially outwardly from the outer peripheral surface of the housing 1, a guide sleeve 6 fixedly mounted on the arm 5 and extending in substantially parallel relation to the axis or center line of the housing 1, a rotation-preventing pin 8 slidably fitted in the guide sleeve 6 and urged outwardly by a spring 7, and a slidable tube 9 slidably fitted on the rotation-preventing pin 8 and urged outwardly by a spring 10. The slidable tube 9 has a retainer pawl 11 extending radially outwardly from the rear end thereof. The retainer pawl 11 serves to locate an input shaft 17 in position relative to the housing 1, as later described.

A holder shaft 12 contains main parts of the traction drive mechanism, and is mounted in the housing 1 in coaxial relation to the outer ring 2. The holder shaft 12 is rotatably supported by bearings 13 and 14. The front and rear end portions 12a and 12b of the holder shaft 12 extend outwardly respectively through central openings of covers 15 and 16 secured respectively to the opposite ends of the housing 1. The input shaft 17, having a tapered shank 19, is connected by a connecting bolt 18 to the rear end 12b of the holder shaft 12.

The input shaft 17 has a flange portion 20 adjacent to the end of the tapered shank 19, and a gripping arm of the automatic tool changer engages the flange portion 20. Formed in the outer peripheral surface of the flange portion 20 is a key groove 21 in which a drive key 42 of a main shaft or spindle 41 of the machine is engaged. The flange portion 20 also has a groove 22 formed in its outer peripheral surface at its front end, and the retainer pawl 11 is engageable in the groove 22. The retainer pawl 11 is normally urged outwardly by the spring 10 and is engaged in the groove 22 to hold the input shaft 17 in position relative to the housing 1. A notch 23 is formed in the outer peripheral portion of the cover 16 facing the groove 22. As shown in FIG. 1, in the operative condition of the spindle device in which the tapered shank 19 of the input shaft 17 is engaged in the main shaft 41 of the machine, the rotation-preventing pin 8 is engaged in an engaging recess 44 formed in a rotation-preventing block 43 of a U-shape fixedly secured to the front end face of the machine body 40, thereby holding the housing 1 against rotation relative to the machine body 40. Also, in this condition, the slidable tube 9 abuts against the front end of the block 43 and is urged toward the arm 5 against the bias of the spring 10, so that the retainer pawl 11 at the rear end of the slidable tube 9 is disposed out of the groove 22 and is engaged in the notch 23. As a result, the input shaft 17 is rotatable relative to the housing 1, and the holder shaft 12 can be rotated by the main shaft 41 of the machine through the input shaft 17.

A high-speed spindle 25 is mounted in a bore 26 formed in the holder shaft 12 and extending axially from its front end toward its rear end, the spindle 25 being rotatably supported by bearings 27, 28 and 29. A tool holder 30 is attached to the front end of the high-speed spindle 25 extending exteriorly. The high-speed spindle 25 has a rear portion being connected to a roller shaft portion 31 serving as a sun roller of the traction drive mechanism. Three holes 32 are formed in the holder shaft 12 at a substantially center portion thereof in the axial direction and extend radially from the outer peripheral surface of the holder shaft 12 toward the center thereof, the holes 32 communicating with the bore 26. The holes 32 are provided for receiving planetary rollers 33 of the traction drive mechanism, as later described. In the illustrated embodiment, the three radial holes 32 are circumferentially spaced from one another with an angle of 120 degrees, as shown in FIG. 2.

The three planetary rollers 33 of the traction drive mechanism are disposed between the outer ring 2 and the roller shaft portion (sun roller) 31 and are circumferentially spaced from one another with an angle of 120 degrees. The planetary rollers 33 are disposed in sliding contact with the inner peripheral surface (race) of the outer ring 2 and the outer peripheral surface of the roller shaft portion 31 to provide the traction drive mechanism. The three planetary rollers 33 are received respectively in the holes 32, and are rotatably mounted respectively on support pins 34 through needle roller bearings 35, the support pins 34 being mounted on the holder shaft 12 along the axis thereof. Formed in the inner peripheral surface of the outer ring 2 are annular grooves 36 for holding a lubricant.

When the holder shaft 12 is rotated in response to the rotation of the main shaft 41 of the machine through the input shaft 17, the three planetary rollers 33 revolve about the roller shaft portion 31 serving as the sun roller, and also rotate about their own axes, so that the power is transmitted to the roller shaft portion 31 through a film of oil (lubricant) defined by the lubricant and disposed at the area of contact between each planetary roller 33 and the roller shaft portion 31, thereby rotating the high-speed spindle 25 at an increased speed. Therefore, the cutting tool (not shown) attached to the holder 30 mounted on the front end of the high-speed spindle 25 is rotated at a high speed.

As described above, in the speed-up spindle device of this embodiment, comprising the main parts of the traction drive mechanism (the speed-up means), that is, the high-speed spindle 25, the roller shaft portion 31 (the sun roller) and the planetary rollers 33 are mounted in the bore 26 and the holes 32 (which communicate with the bore 26) respectively of the holder shaft 12 connected to the input shaft 17. Therefore, the rigidity of the overall construction is high, and the precision is stable. This prevents the cutting tool from undergoing vibration during the cutting operation, and also enables the traction drive (speed-up) spindle device to operate under an increased load.

Figure 3:
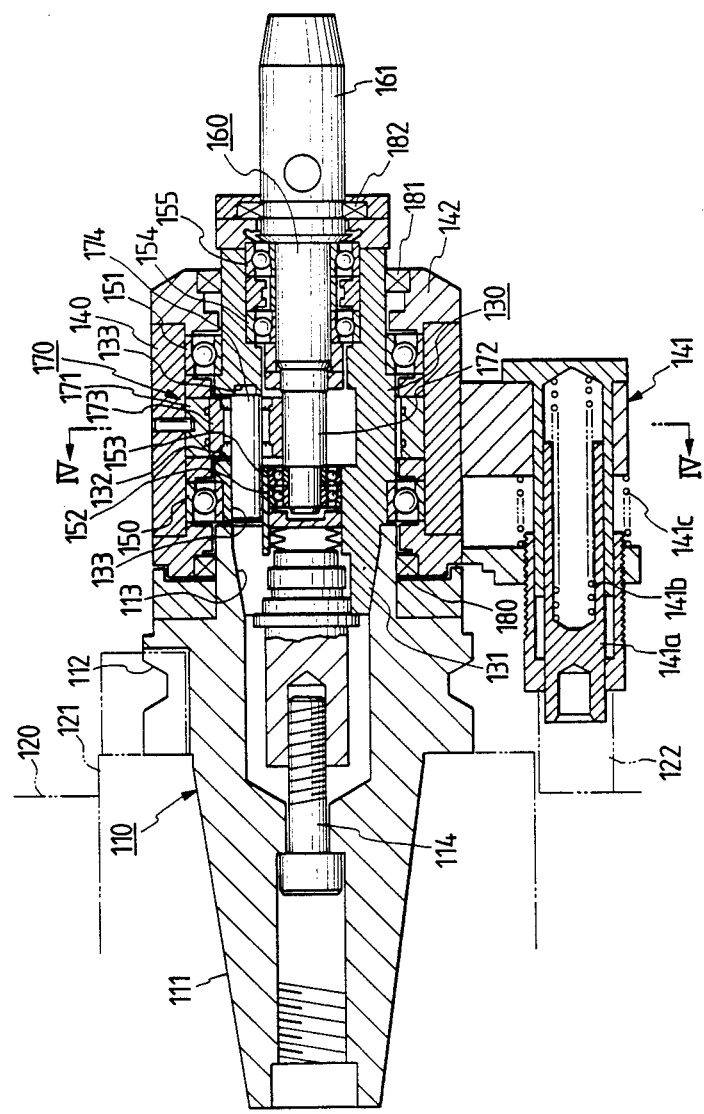
FIG. 3 is a view similar to FIG. 1 but showing a modified traction drive spindle device.

A second preferred embodiment of the invention will now be described with reference to FIGS. 3 and 4. Here, the invention is embodied in a traction drive spindle for use in an automatic tool changer.

An input shaft 110 has a tapered shank 111 which is connected to a main shaft or spindle 121 of a machining center 120 so that the input shaft 110 can rotate together with the main shaft 121. A peripheral groove 112 is formed in the outer peripheral surface of the input shaft 110 at one end thereof, and a hand of the automatic tool changer (not shown) is engaged in the groove 112 when the input shaft 110 is connected to the main shaft 121. The input shaft 110 has a tapered bore 113 opening toward its output end.

A hollow holder shaft 130 is connected to the output end of the input shaft 110 in coaxial relation thereto. The holder shaft 130 has at its input end a tapered portion 131 inserted in the tapered bore 113 of the input shaft 110. The tapered portion 131 of the holder shaft 130 is press-fitted into the tapered bore 113 of the input shaft 110, and the holder shaft 130 is integrally connected to the input shaft 110 coaxially therewith by a bolt 114 contained in the input shaft 110 and threaded into the holder shaft 130. A housing 140 is mounted on the outer periphery of the holder shaft 130 through two ball-and-roller bearings 150 and 151 so as to be rotatable relative to the holder shaft 130.

A tool (not shown) such as a cutting tool is attached to a high-speed spindle 160 serving as an output shaft. The high-speed spindle 160 is mounted in the bore of the hollow holder shaft 130 and is rotatably supported by two pairs of ball-and-roller bearings 152, 153, 154 and 155, the two pairs being provided at a substantially center portion of the high-speed spindle in the axial direction thereof and the output side of the high-speed spindle 160, respectively. The high-speed spindle 160 has at its end a tool holder 161 for holding a tool.

A rotation-preventing mechanism 141, which is engageable with an engaging portion 122 provided at the machining center 120, is mounted on the outer periphery of the housing 140. The rotation-preventing mechanism 141 comprises a retainer pin 141a engageable with the engaging portion 122, a spring 141b for urging the retainer pin 141a toward the machining center, and a spring 141c preventing a rattling between the housing 140 and the machining center 120.

A traction drive mechanism 170 is mounted within the housing 140 and is disposed at a substantially center portion of the holder shaft 130 in the axial direction thereof.

The traction drive mechanism 170 comprises a fixed ring 171 fitted in the housing 140 and fixedly secured to the inner peripheral surface of the housing 140 at a substantially central portion of the housing in the axial direction thereof, a sun shaft 172 defined by the input portion of the high-speed spindle 160, a plurality of planetary rollers 173 rollingly engaged with the sun shaft 172 and the fixed ring 171, and planetary shafts 174 on which the planetary rollers 173 are mounted, respectively, through needle roller bearings. The planetary shafts 174 are supported by respective openings 132 and respective holes 133 both of which are formed in the holder shaft 130, the openings 132 opening to the outer periphery of the holder shaft 130, and the openings 132 as well as the holes 133 being spaced from one another circumferentially of the holder shaft 130. The planetary shafts 174 are rotatable in unison with the holder shaft 130 and the input shaft 110.

A disc-shaped cover 142 is secured to the output end of the housing 140. A seal 181 is mounted on the inner periphery of the cover 142, and a seal 180 is also mounted between the housing 140 and the input shaft 110. The seals 180 and 181 serve to seal an internal space formed by the housing 140 and the holder shaft 130. A seal 182 is also provided at the output side of the holder shaft 130 and seals an internal space formed between the holder shaft 130 and the high-speed spindle 160. A lubricant such as grease is sealed in the above-mentioned two internal spaces so as to lubricate the ball-and-roller bearings 150 to 155 and the traction drive mechanism 170.

The operation of the traction drive spindle device of this embodiment will now be described.

The power of the main shaft 121 of the machining center 120 is transmitted to the planetary rollers 173 via the input shaft 110, the holder shaft 130 and the planetary shafts 174. As a result, the planetary rollers 173 rotate about their own axes and also revolve about the sun shaft 172, so that as is well known in the art, the speed of rotation of the sun shaft 172 is increased at a certain rate. Thus, the sun shaft 172 is rotated at a high speed. Therefore, the high-speed spindle 160, which is integral with the sun shaft 172, is rotated at such a high speed.

Thus, the traction drive spindle device of this embodiment can cause the tool (not shown), attached to the high-speed spindle 160, to rotate at a high speed even if the main shaft 121 rotating at a low speed is used as a drive source.

In this embodiment, the input shaft 110 and the holder shaft 130 supporting the high-speed spindle (output shaft) 160 are integrally connected together in coaxial relation to each other, and the housing 140 is mounted on the outer periphery of the holder shaft 130. With this construction, an inclining of the housing 140, which would be caused by the resilient force of the springs 141b and 141c of the rotation-preventing mechanism 141 being translated to the housing 140, is resisted by the holder shaft 130, thus restraining the inclining of the housing 140. If the ball-and-roller bearings 150 and 151 disposed between the housing 140 and the holder shaft 130 are made of metal rather than ceramic, an inclining of the housing 140 would normally be unavoidable due to the weight of metal bearings. Even in this case, since the high-speed spindle (output shaft) 160 is not supported directly on the housing 140 but is supported by the holder shaft 130, the axis of the high-speed spindle 160 is not inclined relative to the input shaft 110. Particularly, in this embodiment, the parts of the ball-and-roller bearings 150 and 151 are made of ceramics, which has high rigidity, containing as a main component silicon nitride, thiaron or the like so as to restrain the inclining of the housing 140 and also to enable the device to bear an increased load. Even if only the balls of the ball-and-roller bearings are made of ceramics, a greater rigidity can be obtained as compared to ordinary ball-and-roller bearings made of general bearing steel. All the parts of the ball-and-roller bearings may be made of ceramics.

In the traction drive spindle device of this embodiment, if the ball-and-roller bearings 154 and 155, supporting the high-speed spindle 160 rotatable at high speed, are made of metal, the lubricant sealed in the internal space for lubricating these bearings is liable to be deteriorated at a relatively early stage. This makes it difficult for the overall device to have a prolonged service life. Therefore, in this embodiment, at least the balls of the ball-and-roller bearings 154 and 155 disposed between the high-speed spindle 160 and the holder shaft 130 are made of ceramics, thereby increasing the service life of the lubricant for lubricating the bearings 154 and 155. Incidentally, when only the balls of the ball-and-roller bearings 154 and 155 were made of ceramics, the service life of the lubricant, sealed in the internal space within which the ball-and-roller bearings 154 and 155 are disposed, was about three times longer than that achieved by bearings of steel.

As described above, in the speed-increasing spindle device of this embodiment, the holder shaft 130 is integrally connected to the input shaft 110 in coaxial relation thereto, and the housing 140 is mounted on the outer periphery of the holder shaft 130. With this arrangement, even if the housing 140 is inclined, such inclination can be resisted by the holder shaft 130, thereby restraining the inclining of the holder shaft 130 relative to the input shaft 110. Therefore, the high-speed spindle 160 serving as the output shaft are supported by the holder shaft 130 can be accurately disposed in alignment with the drive main shaft, thereby enhancing the precision of rotation.

Further, since only the balls or both the balls and the rollers of the ball-and-roller bearings 150, 151, 154 and 155 are made of ceramics, the lubricant, sealed in the spaces within which these bearings are disposed, can enjoy a longer service life as compared with the conventional device employing ball-and roller bearings made of metal, which increases the service life of the overall device.

What is claimed is:

1. A traction drive spindle device, comprising:
   a generally tubular housing having a central axis, front and rear openings, and a rotation preventing means for preventing said housing from rotating relative to a machine body;
   a ring fixedly secured to an inner periphery of said housing, said ring having an inner peripheral surface;
   a holder shaft, having an outer peripheral surface, rotatably supported in said housing in radially spaced coaxial relationship to said ring, said holder shaft having front, center, and rear portions, said front and rear portions extending exteriorly of said respective front and rear openings in said housing, said holder shaft having a central bore penetrating the front portion and extending to a point intermediate said center and rear portions, and a plurality of circumferentially spaced apertures communicating between the outer peripheral surface and the central bore;
   a spindle rotatably supported in the central bore of said holder shaft, said spindle having front and rear end portions;
   means for mounting a tool connected to the front end portion of said spindle and extending exteriorly of said central bore;
   a roller shaft having an outer peripheral surface, connected to the rear end of said spindle, rotatably supported in the central bore of said holder shaft in the vicinity of said apertures;
   a rotatable input shaft connected to the rear portion of said holder shaft; and
   a plurality of planetary rollers rotatably mounted on pins extending from the holder shaft, having peripheral surfaces extending radially from said pins into the circumferentially spaced apertures in said holder shaft, and disposed in sliding contact between the inner peripheral surface of said ring and the outer peripheral surface of said roller shaft.

2. A traction driven spindle device according to claim 1 further comprising a first rolling bearing interposed between said housing and said holder shaft.

3. A traction drive spindle device according to claim 2 wherein said first rolling bearing comprises a plurality of rolling elements made of ceramics.

4. A traction drive spindle drive according to claim 2 further comprising a second rolling bearing interposed between said spindle and said holder shaft.

5. A traction drive spindle device according to claim 4, wherein said second rolling bearing comprises a plurality of rolling elements made of ceramics.

6. A traction drive spindle device comprising:
   an input shaft defining an axis, having front and rear ends, the rear end connected to a main drive shaft;
   a holder shaft having a central bore, connected to the front end of said input shaft in coaxial relation, said holder shaft having a peripheral surface penetrated by a plurality of apertures communicating with said central bore, and a plurality of planetary rollers rotatably mounted in said apertures intermediate opposite ends of said holder shaft;
   a spindle rotatably supported in the bore of said holder shaft, said spindle having an inner end portion disposed in rolling contact with said planetary rollers; and
   a housing mounted on the peripheral surface of said holder shaft through a first rolling bearing to be rotatable relative to said holder shaft, said housing having a ring fixed to an inner periphery thereof, and said planetary rollers being disposed in rolling contact with said fixed ring.

7. A traction drive spindle device according to claim 6, further comprising:
   a second rolling bearing interposed between said holder shaft and said spindle, said second rolling bearing comprising a plurality of rolling elements made of ceramics.

8. A traction drive spindle device according to claim 7, wherein said first rolling bearing comprises a plurality of rolling elements made of ceramics.

9. A traction drive spindle device, comprising:
   a generally tubular housing having a central axis, front and rear openings, and a rotation preventing means for preventing said housing from rotating relative to a machine body;
   a ring fixedly secured to an inner periphery of said housing, said ring having an inner peripheral surface, said inner peripheral surface including an annular groove for holding a lubricant;
   a holder shaft, having an outer peripheral surface, rotatably supported in said housing in radially spaced coaxial relationship to said ring, said holder shaft having front, center, and rear portions, said front and rear portions extending exteriorly of said respective front and rear openings in said housing, said holder shaft having a central bore penetrating the front portion and extending to a point intermediate said center and rear portions, and a plurality of circumferentially spaced apertures communicating between the outer peripheral surface and the central bore;

a spindle rotatably supported in the central bore of said holder shaft, said spindle having front and rear end portions;

means for mounting a tool connected to the front end portion of said spindle and extending exteriorly of said central bore;

a roller shaft having an outer peripheral surface, connected to the rear end of said spindle, rotatably supported in the central bore of said holder shaft in the vicinity of said apertures;

a rotatable input shaft connected to the rear portion of said holder shaft; and a plurality of planetary rollers rotatably mounted on pins extending from the input shaft, having peripheral surfaces extending radially from said pins into the circumferentially spaced apertures in said holder shaft, and disposed in sliding contact between the inner peripheral surface of said ring and the outer peripheral surface of said roller shaft.

10. A traction drive spindle device, comprising:

a generally tubular housing having a central axis and front and rear openings;

a ring fixedly secured to an inner periphery of said housing, said ring having an inner peripheral surface;

a holder shaft, having an outer peripheral surface, rotatably supported in said housing in radially spaced coaxial relationship to said ring, said holder shaft having front, center, and rear portions, said front and rear portions extending exteriorly of said respective front and rear openings in said housing, said holder shaft having a central bore penetrating the front portion and extending to a point intermediate said center and rear portions, and a plurality of circumferentially spaced apertures communicating between the outer peripheral surface and the central bore;

a spindle rotatably supported in the central bore of said holder shaft, said spindle having front and rear end portions;

means for mounting a tool connected to the front end of said spindle and extending exteriorly of said central bore;

a roller shaft having an outer peripheral surface, connected to the rear end portion of said spindle, rotatably supported in the central bore of said holder shaft in the vicinity of said apertures;

a rotatable input shaft connected to the rear portion of said holder shaft;

a plurality of planetary rollers rotatably mounted on pins extending from the input shaft, having peripheral surfaces extending radially from said pins into the circumferentially spaced apertures in said holder shaft, and disposed in sliding contact between the inner peripheral surface of said ring and the outer peripheral surface of said roller shaft; and a rotation preventing means for preventing said housing from rotating relative to a machine body, said rotation preventing means including an arm extending radially from an outer peripheral surface of said housing, a guide sleeve fixed mounted on said arm and extending in substantially parallel relation to the axis of said housing, a pin slidably supported in the guide sleeve and urged by a first spring, and a slidable tube having a rear end slidably fitted on said pin and urged by a second spring.

11. A traction drive spindle device according to claim 10, wherein said slidable tube has a retainer point extending radially from the rear end thereof, said retainer point serving to locate said input shaft in position relative to said housing.

* * * * *